Sept. 15, 1959  R. J. HADDIX  2,904,132
AUXILIARY SUPPORT FOR LIFT
Filed May 25, 1955  3 Sheets-Sheet 2
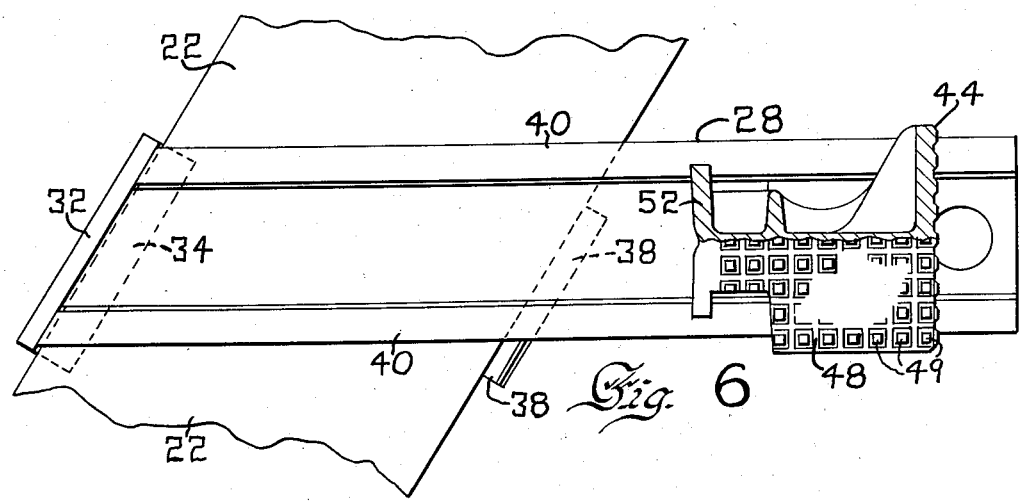
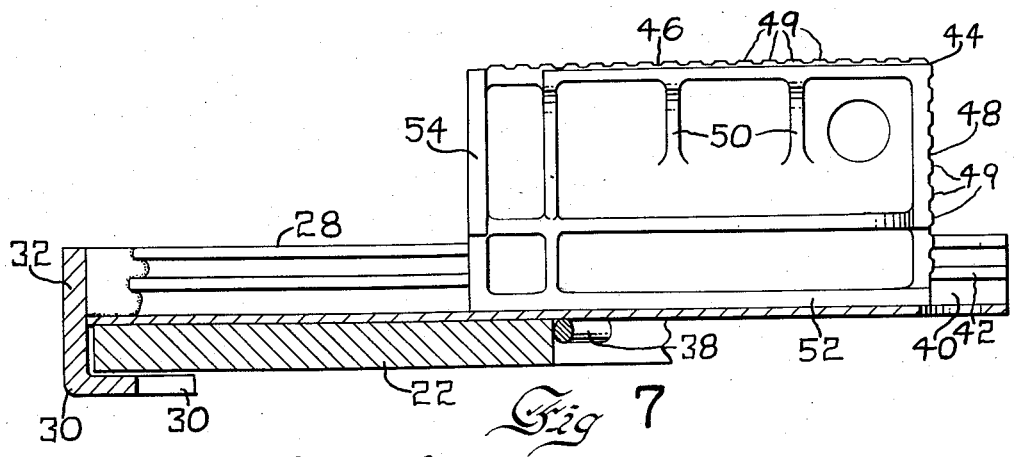
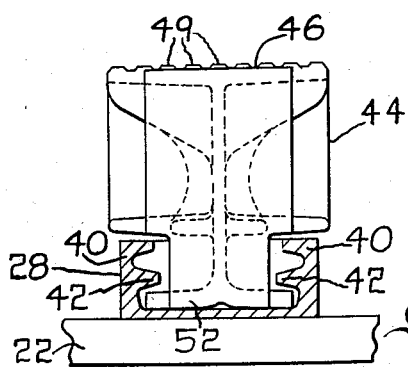
INVENTOR.
Robert J Haddix
BY
HIS ATTORNEYS Sept. 15, 1959 R. J. HADDIX 2,904,132
AUXILIARY SUPPORT FOR LIFT
Filed May 25, 1955 3 Sheets-Sheet 3
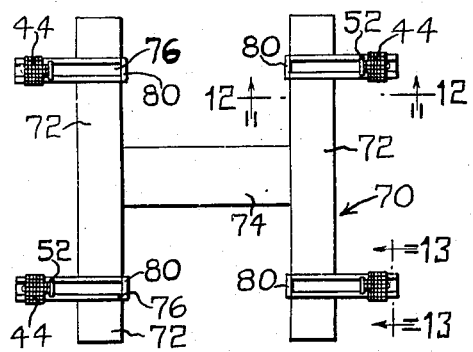
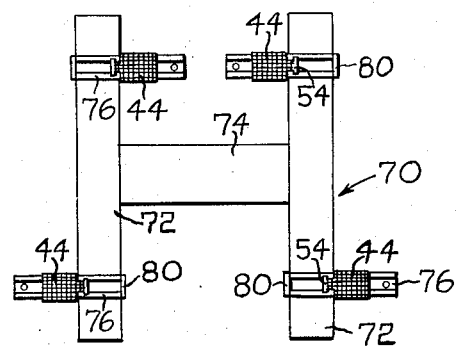
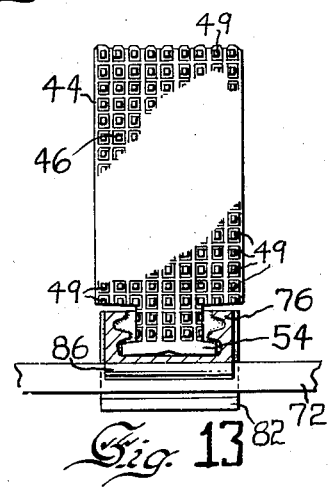
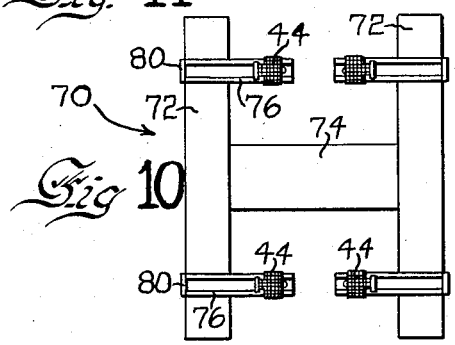
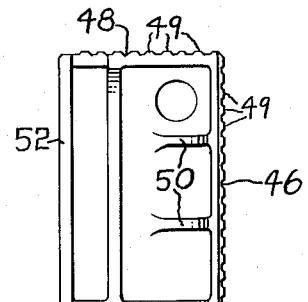
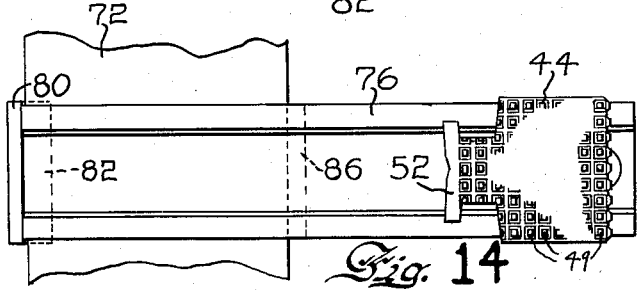
INVENTOR.
Robert J. Haddix
BY
HIS ATTORNEYS

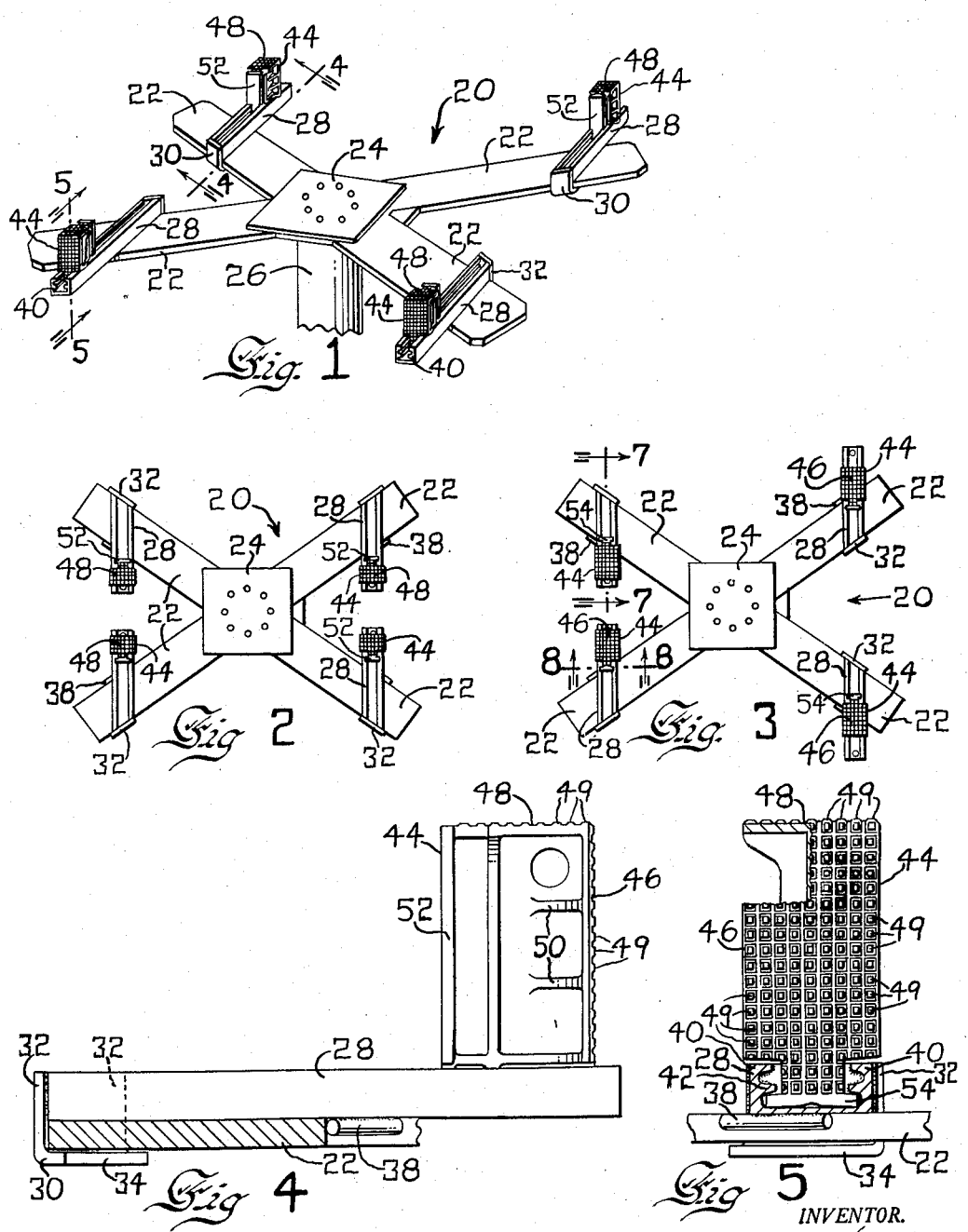

United States Patent Office 2,904,132
Patented Sept. 15, 1959

2,904,132
AUXILIARY SUPPORT FOR LIFT

Robert J. Haddix, Dayton, Ohio, assignor to The Joyce-Cridland Company, Dayton, Ohio, a corporation of Ohio Application May 25, 1955, Serial No. 511,041

3 Claims. (Cl. 187—8.75)

This invention relates to an auxiliary support assembly for a lift. The invention relates more particularly to an auxiliary support assembly for a vehicle lift which is adapted for use in supporting any one of a variety of automobiles and other vehicles. The invention relates still more particularly to an auxiliary support device for supporting automobiles and other vehicles without engagement with the wheels thereof. However, the invention is not so limited in that it may be applied to other types of lifts and support means.

In garages, filling stations, and other places where automobiles, trucks and other vehicles are repaired, serviced or assembled, it has been common practice to lift a vehicle above the height of a workman in order to enable him to work under the vehicle. Various types of lifts have been devised. A type of lift which supports the vehicle without engagement with the wheels thereof often enables the workman to more properly perform work upon various parts of the vehicle. For example, it is often easier to lubricate the spring members and also enables the workman to more easily work on the wheels of the vehicle. This type of lift which does not engage the wheels of a vehicle is often referred to as a frame type of lift.

However, a problem has always existed in the frame type of lift due to the fact that all types and makes of automobiles and trucks do not have the same types or arrangements of frame members. Frame members of automobiles and trucks are not built to any set of design standards. Furthermore, some types of automobiles do not have members which can be conventionally classified as frame members. Therefore, numerous problems have existed in attempts to create lift members to support various vehicles without engagement with the wheels thereof.

An object of this invention is to provide an auxiliary support assembly for a vehicle lift, which auxiliary support assembly enables support of various types of vehicles without engagement with the wheels thereof.

Another object of the invention is to provide an auxiliary support assembly which is easily and readily adjustable.

Another object of this invention is to provide an auxiliary support assembly which may be used for engagement with various portions of a vehicle for support thereof so that other portions of the vehicle are readily accessible for work thereon.

Another object of the invention is to provide such an auxiliary support assembly which may be sturdily built of lightweight materials and which may be easily manipulated.

Other objects and advantages reside in the construction of parts, the combination thereof and the mode of operation, as will become more apparent from the following description.

In the drawings:

Figure 1 is a perspective view of an X-shaped, one-post lift provided with a plurality of auxiliary support assemblies of this invention.

Figure 2 is a top plan view of an X-shaped, one-post lift provided with a plurality of auxiliary support assemblies of this invention, the elements of the auxiliary support assemblies being adjusted for lifting of a vehicle having a narrow type of frame.

Figure 3 is a top plan view of a single-post X-shaped lift provided with a plurality of auxiliary support assemblies of this invention, the elements of the assemblies being adjusted in a different arrangement from the arrangements shown in Figures 1 and 2.

Figure 4 is an enlarged sectional view taken substantially on line 4—4 of Figure 1.

Figure 5 is an enlarged side sectional view, with parts broken away, and taken substantially on line 5—5 of Figure 1.

Figure 6 is an enlarged fragmentary top elevational view, with parts broken away, of one of the auxiliary support assemblies as shown in Figure 1.

Figure 7 is an enlarged sectional view taken substantially on line 7—7 of Figure 3.

Figure 8 is an enlarged sectional view taken substantially on line 8—8 of Figure 3.

Figure 9 is a top elevational view of an H-type of lift provided with a plurality of auxiliary support assemblies of this invention, the support blocks of the auxiliary support assemblies being disposed vertically and arranged for engagement with the frame member of a vehicle having a wide type of frame.

Figure 10 is a top elevational view of an H-type of lift similar to that of Figure 9, showing the support blocks of the auxiliary support assemblies being disposed vertically and arranged for engagement with a vehicle having a narrow type of frame.

Figure 11 is a top elevational view of an H-type of lift provided with a plurality of auxiliary support assemblies of this invention with the support blocks of the auxiliary support assemblies being disposed horizontally and arranged for engagement with the lower portion of a vehicle having a different type of frame member from the frame members engaged by the arrangements shown in Figures 9 and 10.

Figure 12 is an enlarged section view taken substantially on line 12—12 of Figure 9.

Figure 13 is an enlarged section view taken substantially on line 13—13 of Figure 9.

Figure 14 is an enlarged fragmentary top elevational view of an auxiliary support assembly as shown in Figure 9.

Referring to the drawings in detail, a vehicle lift 20 of the X-type is provided with a plurality of horizontal arms or rails 22. Each of the rails 22 is attached to a centrally located plate 24, which is directly above the upper end of a reciprocally movable vertical post 26.

Slidably mounted upon each of the arms or rails 22 is an elongate retainer or carriage member 28. One end of each of the retainer members 28 is angularly formed with respect to the longitudinal axis thereof. Attached to said end of the retainer member 28 is a guide bracket 30. The guide bracket 30 is provided with a leg 32 which may be welded or otherwise firmly attached to the angularly formed end of the retainer 28. The guide bracket 30 also is provided with a leg 34 disposed in a plane normal to the leg 32. The leg 34 of the bracket 30 extends under the carriage 28 parallel to the longitudinal axis thereof and is spaced therefrom. The distance between the leg 34 and the carriage 28 is slightly greater than the thickness of the rail 22. Thus, the guide bracket 30 has a leg 32 adapted to slidably engage the edge surface of the rail 22 and a leg 34 adapted to slidably engage the lower surface of the rail 22, as clearly shown in Figures 4 and 7.

Attached to the carriage 28 intermediate the ends thereof and at the lower surface thereof is a guide rod 38. The guide rod 38 is secured to the carriage 28 by means of welding or the like and is disposed in parallel relation to the leg 32 of the bracket 30. The distance between the leg 32 and the guide rod 38 is slightly greater than the width of the rail 22. Thus, the carriage 28 can be readily attached and detached from the rail 22 at any point along the length thereof. It is not necessary to move the carriage 28 to the end of the rail 22 upon which it is mounted in order to remove the carriage 28 from the rail 22. All that is necessary to remove the carriage 28 from the rail 22 is to raise the end opposite the bracket 30 of the carriage 28, thus lifting the guide rod 38 above the level of the upper surface of the rail 22. The carriage 28 may then be slidably moved from the rail 28 by sliding the leg 34 of the bracket 30 from engagement with the rail 22. The guide rod 38 is shown here as being circular in cross section. However, it is to be understood that according to this invention the rod 38 may also be of other cross sectional shapes.

The carriage 28 is provided with a pair of longitudinal side members 40 forming a channel therebetween, as best shown in Figures 5 and 8. Each side member 40 has a longitudinal overhanging projection 42 extending into the channel of the carriage 28.

A plurality of support blocks 44 are also provided. Each support block 44 is adapted to be carried by one of the carriage members 28. Each of the support blocks 44 approximates a parallelepiped having a longitudinal support plate or surface 46 and a transverse or edge support plate or surface 48. Each of the support surfaces 46 and 48 is provided with a plurality of rectangular protuberances 49 which act as mechanical resistance elements adapted to operate in a conventional manner to support an object while preventing sliding movement of the object. The inner portions of the support block 44 are cut out to some extent to aid in decreasing the weight of the support block. Various internal web members or brace members 50 are used within the support block 44.

The support blocks 44 and the carriage members 28 are preferably made out of an aluminum alloy or other lightweight material so that they are readily and easily manipulated and adjusted. The support blocks 44 and the carriage members 28 are usually adjusted in preparation for each use of the vehicle lift. Therefore, it is highly desirable that these members be light in weight.

Integral with the support block 44 opposite the longitudinal support surface 46 and parallel therewith is an elongate T-shaped flange 52. Integral with the support block 44 opposite the transverse support surface 48 and parallel therewith is an elongate T-shaped flange 54. Each of the T-shaped flanges 52 and 54 is adapted to be slidably inserted and movable within the channel of the carriage 28. The flange 52 or 54 is inserted below the projections 42 of the side members 40 as shown in Figures 5 and 8.

When it is desired to position one of the support blocks 44 with the longitudinal support surface 46 thereof uppermost, the flange 52 is inserted within the channel of the carriage 28, as shown in Figure 8. When it is desired to position one of the support blocks 44 with the transverse support surface 48 uppermost, the flange 54 thereof is inserted within the channel of one of the carriage members 28, as shown in Figure 5.

It has been learned in connection with this invention that it is very desirable to have edgewise means, such as the transverse support surfaces 48, and also to have longitudinal support surfaces 46 for support of vehicles. It is often difficult to support some types of vehicles without engagement with the wheels thereof. This is due to the fact that some vehicles do not have readily accessible members under the vehicle for engagement therewith for supporting the vehicle. In such cases, the transverse support surfaces 48 are used.

Also, it is sometimes desirable to lift one portion of a vehicle higher than other portions thereof for performing various types of work thereon. In such instances, some of the support blocks 44 are positioned with the longitudinal surfaces 46 uppermost; some of the support blocks 44 are then positioned with the transverse support surfaces 48 uppermost. Also, it is sometimes desirable to lift a vehicle to a higher level than is possible by use of the longitudinal support surface 46 of the support blocks 44. It is then desirable to use the transverse or edge support surface 48 of the support blocks 44.

As shown in the Figures 1, 2 and 3, the retainer members or carriage members 28 may be slidably moved upon the rails 22 to any desired position thereof. The support block 44 carried by each retainer member 28 may be slidably moved within the channel thereof. The carriage members 28 may be positioned so that they extend inwardly as shown in Figure 2, or extend outwardly, as shown in Figure 1. The carriage members 28 may also be positioned so that some of the carriage members extend inwardly and some extend outwardly, as shown in Figure 3.

Due to the fact that both the carriage members 28 and the support blocks 44 are readily adjustable and transposable, a wide variety of combinations is possible, as suggested by Figures 1, 2 and 3.

In Figures 9, 10 and 11 is shown an H-type of lift 70. The lift 70 is provided with elongate parallel rails 72 joined by a support plate 74. Slidably mounted upon each of the rails 72 are a pair of carriage members 76. Each carriage member 76 extends normal to the longitudinal axis of the rail 72 upon which it is mounted. Each carriage member 76 is somewhat similar to the carriage members 28 shown in Figures 1 through 8.

Attached at one end of each of the carriage members 76 is an L-shaped guide bracket 78 provided with legs 80 and 82, normal one to the other. The end of the carriage member 76 to which the leg 80 is attached is normal to the longitudinal axis of the carriage member 76. The leg 82 of the bracket 78 extends below the carriage member 76 and is spaced therefrom. This distance between the carriage member 76 and the leg 82 is slightly greater than the thickness of the rail 72, thus permitting slidable movement between the carriage member 76 and the rail 72, as clearly shown in Figure 12. Firmly attached to the carriage member 76 intermediate the ends thereof and on the lower side thereof is a guide rod 86 which is disposed normal to the longitudinal axis of the carriage member 76. Thus, each carriage member 76 is readily and easily attached and detached from one of the rails 72 at any point along the length thereof.

Each of the carriage members 76 is provided with a longitudinal channel therein, as discussed with respect to the carriage members 28. Support blocks 44, shown in Figures 1 through 8, are also slidably mounted in the carriage members 76 shown in Figures 9 through 14.

As is observed in Figures 9, 10 and 11, the carriage members 76 may be attached to the rail members 72 so that the carriage members 76 extend either inwardly or outwardly from the rail members 72. In Figure 9 all of the carriage members 76 are attached to the rail members 72 so that they extend outwardly therefrom, while in Figure 10, all of the carriage members 76 are attached to the rail members 72 so that they extend inwardly.

Either the carriage members 28 or 76 may be used without the support blocks 44 for support of a vehicle, the vehicle frame being directly engageable with the carriage members.

Thus, the auxiliary support assembly of this invention provides means by which nearly all types of vehicles may be lifted without engagement with the wheels thereof. This invention also provides means by which some portions of the vehicle may be lifted higher than other portions. The auxiliary support assembly of this invention may be constructed so that it is light in weight, easily handled, and readily adjustable. This invention provides means by which various portions of a vehicle may be engaged for support thereof so that other portions of the vehicle are readily accessible for work thereon.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a vehicle hoist of the type having an X-shaped lift member provided with a plurality of angularly disposed rail members, the combination comprising a plurality of carriage members, there being one carriage member slidably and removably mounted upon each of the rail members, a plurality of L-shaped bracket members, there being one L-shaped bracket member attached to one end of each of the carriage members, each bracket member having a leg portion extending parallel to the longitudinal axis of the carriage member and laterally spaced therefrom, the space between the carriage member and said leg portion of the bracket member being slightly greater than the thickness of the rail members, said leg portion being adapted to slidably engage the under side of the rail member to which its respective carriage member is mounted, a guide rod attached to the under side of the carriage member intermediate the ends thereof, the guide rod being angularly disposed with respect to the longitudinal axis of the carriage member and adapted to slidably engage an edge surface of the rail member upon which the carriage member is mounted, a plurality of support block members, there being one support block member for each of the carriage members, each support block member being provided with a longitudinal support surface and a transverse support surface, a first flange attached to each support block member parallel to the longitudinal support surface thereof for slidable attachment of the support block member to one of the carriage members with the longitudinal support surface uppermost, and a second flange attached to each support block member and parallel with the transverse support surface thereof for slidable attachment of the support block member to one of the carriage members with the transverse support surface uppermost.

2. In a vehicle hoist of the type having a lift member provided with a pair of rail members, the combination comprising a plurality of carriage members slidably and removably mounted upon each of the rail members, a plurality of bracket members, there being one bracket member attached to each of the carriage members, each bracket member being provided with a leg portion extending parallel to the longitudinal axis of the carriage member and spaced laterally therefrom, each bracket member being adapted to engage an edge of a rail member, the carriage member being adapted to engage the upper surface of the rail member and the bracket member thus being adapted to slidably engage the opposite surface of the rail member upon which the carriage member is mounted, a plurality of guide members, there being one guide member attached to the underside of each carriage member and slidably engageable with the edge of the rail member opposite the edge thereof engaged by the bracket member so that the carriage member is mountable on the rail member and removable therefrom at any position along the length of the rail member, a plurality of support block members, there being one support block member for each of the carriage members, each support block member being provided with a first support plate, each support block member also being provided with a second support plate angularly disposed with respect to the first support plate, each of the support block members also including a support base integral therewith and spaced from the first support plate and parallel therewith for slidable engagement of the support block member with one of the carriage members with the first support plate horizontal and uppermost, and a second support base integrally attached to the support block member and spaced from said second support plate and parallel therewith for slidable engagement of the support block member with one of the carriage members with the second support plate horizontal and uppermost.

3. A vehicle hoist of the type having a lift member provided with a plurality of rail members, the combination comprising a plurality of carriage members, there being one carriage member slidably and removably mounted upon each of the rail members, a plurality of L-shaped bracket members, there being one L-shaped bracket member attached to one end of each of the carriage members, each bracket member having a leg portion extending parallel to the longitudinal axis of the carriage member and laterally spaced therefrom, the space between the carriage member and said leg portion of the bracket member being slightly greater than the thickness of the rail members, said leg portion being adapted to slidably engage the underside of the rail member to which its respective carriage member is mounted, a guide rod attached to the underside of the carriage member intermediate the ends thereof, the guide rod being adapted to slidably engage an edge surface of the rail member upon which the carriage member is mounted, a plurality of support block members, there being one support block member for each of the carriage members, each support block member being provided with a longitudinal support surface and a transverse support surface, a first flange attached to each support block member parallel to the longitudinal support surface thereof for slidable attachment of the support block member to one of the carriage members with the longitudinal support surface uppermost, and a second flange attached to each support block member and parallel with the transverse support surface thereof for slidable attachment of the support block member to one of the carriage members with the transverse support surface uppermost.

References Cited in the file of this patent

UNITED STATES PATENTS

| | | |
|---|---|---|
| 2,215,934 | Pierce | Sept. 24, 1940 |
| 2,593,635 | Walker | Apr. 22, 1952 |
| 2,612,344 | Thompson | Sept. 30, 1952 |
| 2,659,455 | Green | Nov. 17, 1953 |
| 2,708,988 | Hott et al. | May 24, 1955 |
| 2,777,538 | Cochin | Jan. 15, 1957 |